United States Patent [19]
Smither

[11] Patent Number: 5,209,646
[45] Date of Patent: May 11, 1993

[54] ELECTROMAGNETIC INDUCTION PUMP FOR PUMPING LIQUID METALS AND OTHER CONDUCTIVE LIQUIDS

[75] Inventor: Robert K. Smither, Hinsdale, Ill.

[73] Assignee: The University of Chicago, Chicago, Ill.

[21] Appl. No.: 778,456

[22] Filed: Oct. 16, 1991

[51] Int. Cl.$^5$ ............................................. H02K 44/02
[52] U.S. Cl. ........................................ 417/50; 310/11
[58] Field of Search ............................ 417/50; 310/11

[56] References Cited

U.S. PATENT DOCUMENTS

| | | | |
|---|---|---|---|
| 2,716,943 | 9/1955 | Vandenberg | 417/50 |
| 3,348,487 | 10/1967 | Miller | 417/50 |
| 4,519,447 | 5/1985 | Wiech, Jr. | 417/50 |

FOREIGN PATENT DOCUMENTS

| | | | |
|---|---|---|---|
| 0007005 | 1/1977 | Japan | 417/50 |
| 0913527 | 3/1982 | U.S.S.R. | 417/50 |

OTHER PUBLICATIONS

Schlueter et al., "An Inexpensive Pump for Liquid Sodium" Jun. 1971, *Nuclear Technology*, vol. 11, No. 2, pp. 266–267.

Davidson et al., "Sodium electrotechnology at the Risley Nuclear Power Development Laboratories", *Nuclear Energy*, 1981, vol. 20, Feb., No. 1, 79–90.

Primary Examiner—Richard A. Bertsch
Assistant Examiner—David W. Scheuermann

[57] ABSTRACT

An electromagnetic induction pump in which an electrically conductive liquid is made to flow by means of a force created by interaction of a permanent magnetic field and a DC current. The pump achieves high efficiency through combination of: powerful permanent magnet materials which provide a high strength field that is uniform and constant; steel tubing formed into a coil which is constructed to carry conducting liquids with minimal electrical resistance and heat; and application of a voltage to induce a DC current which continuously produces a force in the direction of the desired flow.

14 Claims, 3 Drawing Sheets

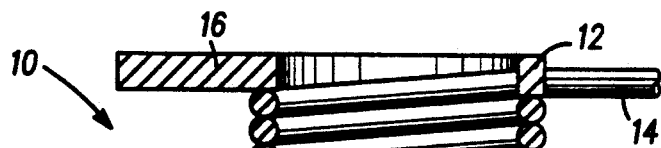
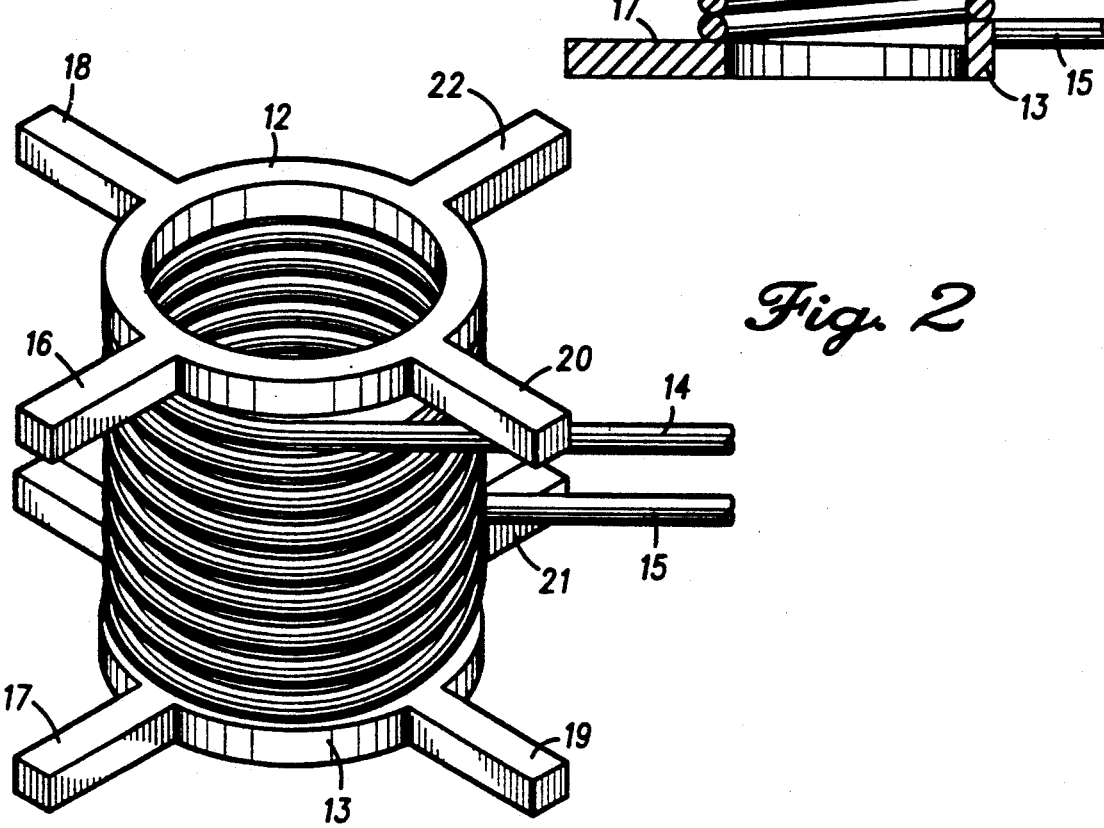
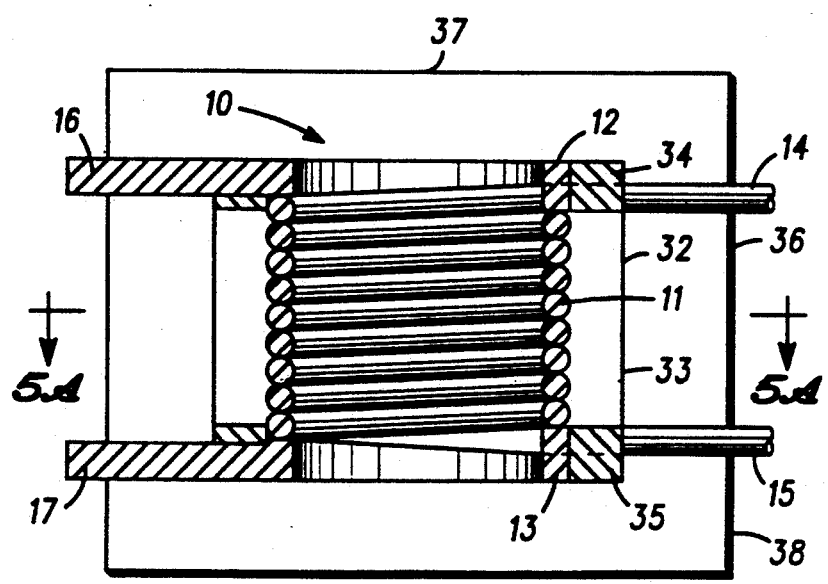

ELECTROMAGNETIC INDUCTION PUMP FOR PUMPING LIQUID METALS AND OTHER CONDUCTIVE LIQUIDS

CONTRACTUAL ORIGIN OF THE INVENTION

The United States Government has rights in this invention pursuant to Contract No. W-31-109-ENG-38 between the U.S. Department of Energy and the University of Chicago.

BACKGROUND OF THE INVENTION

This invention relates to an electromagnetic pump for pumping electrically conductive liquids, for example, liquid metals, and, in particular, to a pump which uses forces created by interaction of a DC current and a permanent magnetic field to cause the flow of a liquid metal.

Much of advanced technology relies upon electronics and other devices which are subject to high heat loads and require highly efficient cooling. Included in this technology are, for example, x-ray equipment and high-speed computer chips. It is desirable that a cooling system used in such a device be of simple construction, small size and mass, and adaptable to varied environments.

It is well known in the prior art that liquid metals are useful in cooling systems as heat transfer fluids. Liquid gallium is particularly useful because of its high thermal conductivity and high volume specific heat. (See further, U.S. Pat. No. 4,953,191, issued to Smither et al, Aug. 28, 1990, U.S. Pat. No. 5,004,319 issued to Smither, Apr. 2, 1991)

Most prior art electromagnetic pumps produce a force to move a conductive liquid by varying a magnetic field in time (pulsating the field) or in time and space (rotating the field). Generally use of varying magnetic fields and pulsating AC currents requires high voltages to overcome electrical resistance and to produce work.

In addition, overcoming electrical resistances and frictional forces sometimes produces significant amounts of heat. If an electromagnetic pump is used in a cooling system, an additional heat exchanger may be required to remove heat added by operation of the pump.

In addition, most prior art cooling systems cannot effectively remove high levels of heat generated from new high power semiconductor devices or high power X-ray/photon sources.

It is therefore an object of this invention to provide a permanent magnet based pump which is compact and suitable for use in cooling equipment such as for X-ray sources and for computer chips.

It is another object of this invention to provide a pump which is capable of moving conductive fluids at high pressures (such as, 100-900 psi) add/or large fluid volume flow rates with low power requirements.

It is another important object of this invention to provide a pump for which heat generated by pumping action is significantly less than the work of heat transfer to be accomplished and does not require additional cooling.

It is a further object of this invention to present a pump with reversible flow which can be used in a variety of environments including a vacuum.

It is yet another object of the invention to provide a liquid metal heat exchanger unit having greatly improved heat transfer capabilities compared to water based heat exchangers.

It is still a further object of the invention to provide a liquid metal heat exchanger wherein the liquid metal is pumped at high pressure and flow rates through a highly efficient heat extraction network of capillary tubing.

It is yet an additional object of the invention to provide a heat exchanger unit using a liquid metal as the heat extraction media wherein the liquid metal has a very low vapor pressure and high surface tension enabling safe operation of the heat exchanger.

Additional objects, advantages and novel features of the invention will become apparent to those skilled in the art upon examination of the following and by practice of the invention.

SUMMARY OF THE INVENTION

To achieve the foregoing and other objects, this invention comprises a magnetic induction pump in which an electrically conductive liquid is made to flow by means of a force created by interaction of a permanent magnet field and a DC current.

The pump achieves high efficiency and a greatly enhanced heat exchange performance through use of a combination of powerful permanent magnet materials which provide a high strength field that is uniform and constant. The system uses tubing formed into a coil which is constructed to carry conducting liquids with minimal electrical resistance and minimal heat formation. A voltage is applied to induce a DC current which continuously produces a force on the liquid metal flow resulting in high pressure and flow rates through capillary tubing disposed adjacent a heat source to be cooled.

BRIEF DESCRIPTION OF THE DRAWINGS

The present invention is illustrated in the accompanying drawings wherein:

FIG. 1 is a cross-sectional side view of the tubing assembly which is part of the present invention;

FIG. 2 is a three-dimensional view of the tubing assembly;

FIG. 3 is a cross-sectional side view showing the fully assembled electromagnetic pump, including the tubing assembly, permanent magnets, and magnet iron yoke and core;

FIG. 1a is a cross-sectional view through line A—A' of FIG. 3, showing magnet segments used to construct the permanent magnets.

DETAILED DESCRIPTION OF PREFERRED EMBODIMENTS

Figure 5A:
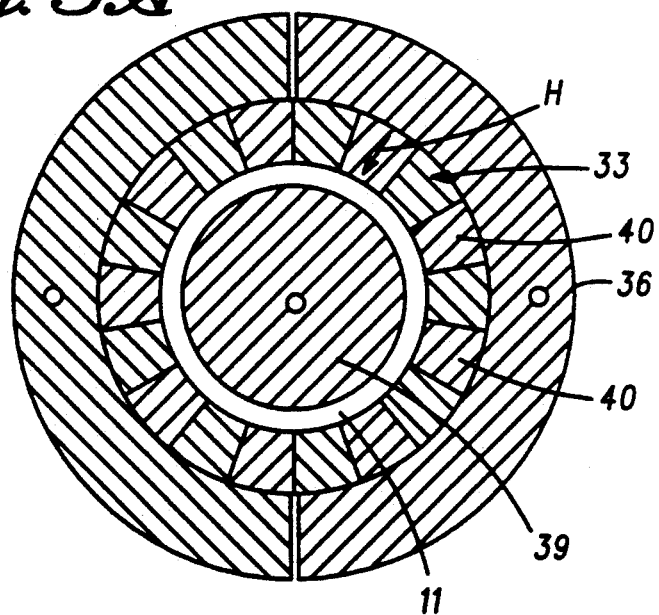
FIG. 5b is a perspective view of a single magnet segment.
Figure 5B:
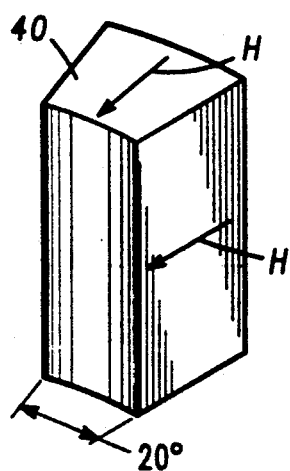
Figure 6A:
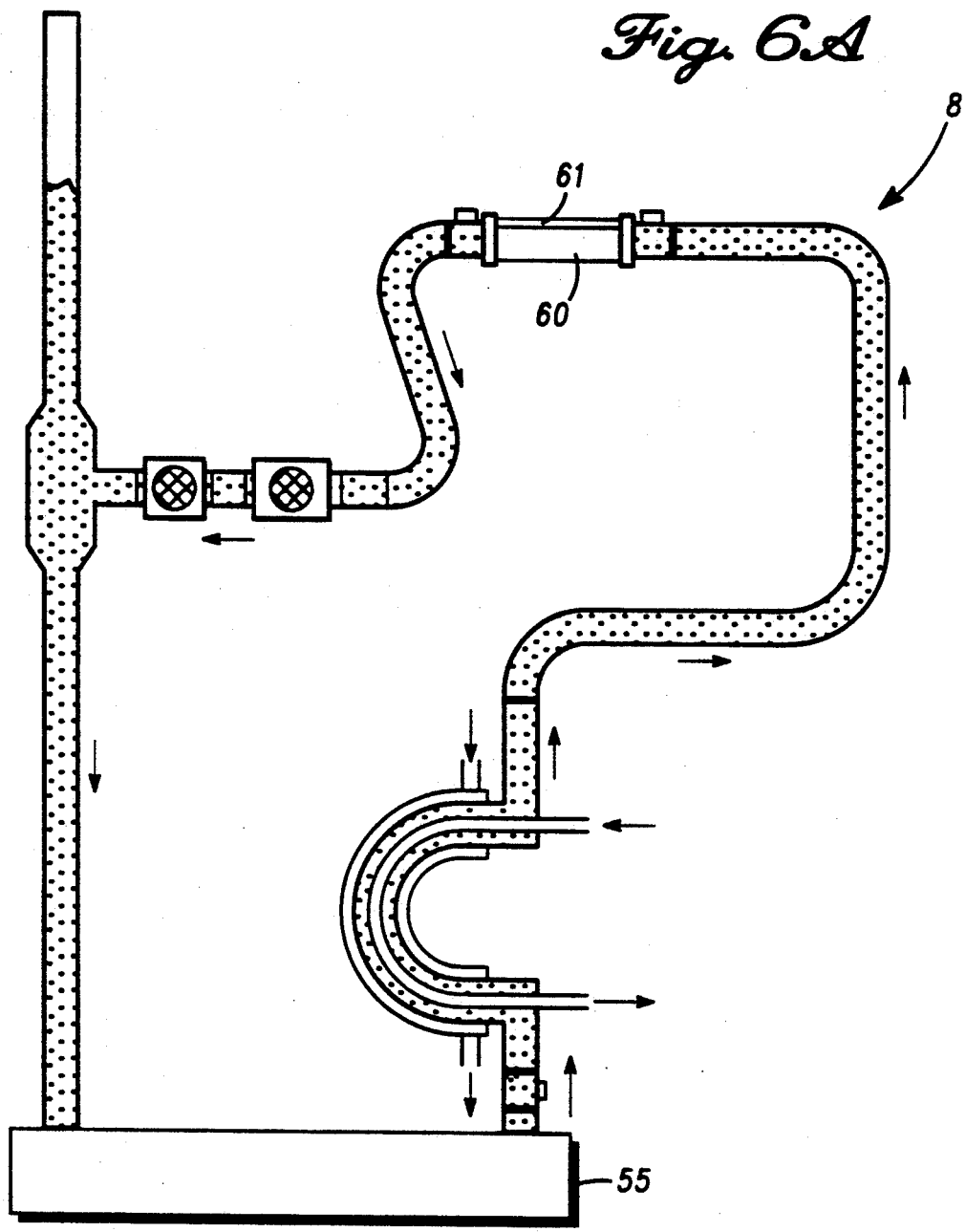
FIG. 6A shows a cooling system comprised of a magnetic induction pump and heat exchanger unit and FIG. 6B illustrates a plan view of the heat exchanger unit.

A cooling system 8 constructed in accordance with the invention is shown generally in FIG. 6A. A liquid metal pump 55 is also shown in FIG. 6A. Details of the pump 55 are illustrated in FIGS. 1-5. In FIG. 1 is shown a cross-sectional side view of tubing assembly 10 comprised of tubing 11, copper end rings 12 and 13, inlet 14, outlet 15, and buss bars 16 and 17 (two of the total of eight buss bars are shown).

The tubing 11 is stainless steel tube which is spiraled to form a cylinder and then soldered at all points of juncture between turns. An electrically conductive liquid, such as liquid gallium, enters the tubing assembly 10 at the inlet 14 and exits at the outlet 15.

The copper end rings 12 and 13 are soldered onto the ends of the cylinder formed by the tubing 11. The rectangular buss bars 16 and 17 are attached to the end rings 12 and 13, respectively. A voltage is applied between the buss bars 16 and 17 for the purpose of conducting a DC current between the rings 12 and 13, along a path created by the tubing 11 and conductive liquid flowing within the tubing 11.

FIG. 2 illustrates a three-dimensional view of the tubing assembly 10, showing seven of eight rectangular buss bars. Buss bars 16, 18, 20, and 22 are attached to the end ring 12 so that each is separated ninety degrees from the next; but buss bars 17, 19, and 21, and another buss bar (not shown) are attached to the end ring 13 so that each is separated ninety degrees from the next.

FIG. 3 is a cross-sectional side view of the fully assembled electromagnetic pump 55, including the tubing assembly 10, permanent magnets 32 and 33, spacers 34 and 35, and yoke pieces 36, 37, and 38, and core 39.

As depicted in FIG. 3, the permanent magnets 32 and 33 encircle the cylinder formed by the tubing 11, and the stainless steel spacers 34 and 35 encircle the end rings 12 and 13, respectively. The magnets 32 and 33 (shown in detail in FIG. 5 below) are high-field rare-earth magnets that produce a very high field (10,000 to 20,000 gauss) across the tubing 11.

The yoke pieces 36, 37, and 38 and the core 39 are fabricated from magnet iron. The yoke piece 36 is cylindrical and encircles the magnets 32 and 33. The yoke pieces 37 and 38 encircle the spacers 34 and 35, respectively, and also cap the ends of the tubing assembly 10. The core 39 fills the interior of the tubing assembly 10.

Figure 4:
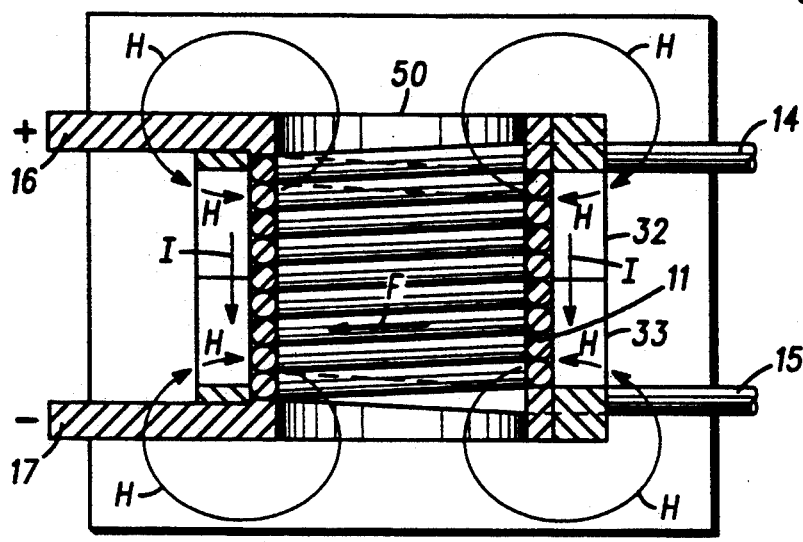
FIG. 4 depicts current flow and magnetic flux within the electromagnetic pump when the pump is operating.

FIG. 4 is a schematic of current flow and magnetic flux within the electromagnetic pump when operating. Magnetic flux generated by the permanent magnets 32 and 33 is constant and flows inwardly from each turn of the tubing 11 toward the center of the cylinder from all points on the circumference of the cylinder. The yoke pieces 36, 37, and 38, and the core 39 complete a magnetic circuit, providing a path for magnetic flux which follows the direction of arrows "H" in FIG. 4.

When a voltage is applied across the buss bars 16 and 17, a direct current is induced through the end rings 12 and 13 and through each turn of the tubing 11 in the direction of arrows I, longitudinally through the cylinder. The force created by interaction of such current and the magnetic field is perpendicular to both, in the direction of arrow "F," pushing the liquid metal through the tubing 11.

FIG. 5a is a cross-sectional view through line A—A' of FIG. 3, showing the permanent magnet 33. The permanent magnet 33 is preferably manufactured of neodymium-iron-boron ($Nd_2Fe_{14}B$) and is comprised of two sets of eighteen magnet segments 40. $Nd_2Fe_{14}B$ is preferred because of its extremely powerful magnetic qualities as compared with traditional magnet materials and because it can be used with ordinary equipment. Those skilled in the art will recognize that other permanent magnet materials may be suitable for certain ones of the embodiments.

As shown in FIG. 5b, each of the magnet segments 40 has an arc of twenty degrees and is individually magnetized so that the direction of the field follows the radius of the segment's curvature, in the direction of arrows H in FIGS. 5a and 5b. In alternate embodiments any number of segments may be provided, depending upon the desired degree of uniformity of field.

Efficiency of the present invention is evident from the following calculation of voltage required when the preferred embodiment is used to supply liquid gallium to a heat exchange system requiring a flow of liquid gallium at a rate of approximately 2–5 gallons per minute at 100–900 psi.

In the preferred embodiment, the tubing 11 is fabricated from stainless steel tube with o.d. of 0.500", and is comprised of 9.5 turns with a total height of 4.875". Copper end rings 12 and 13 are 0.500" wide, and extend the height of the cylinder to 6.25".

When the tubing 11 is filled with liquid gallium, and not pumping gallium, the electrical resistance of the tubing 11 parallel to the cylinder axis (across the turns) plus end rings 12 and 13 is 0.000015 ohms (16 micro ohms). A current of a thousand amps flowing through tubing assembly 10 requires source voltage of 0.016 volts and then generates only 16 watts of electrical heat in the assembly 10.

When the preferred embodiment is pumping liquid gallium, there is an additional back emf generated by moving liquid gallium. If the pump is delivering five gallons per minute (gpm) at one hundred psi, the effective work done by the pump is 222 watts. Assuming a current of a thousand amps, this will require that an additional emf or voltage of 0.222 volts be applied to the coil 10 to do the desired work.

In addition, there is frictional resistance in the tubing 11 to the flow of five gpm. If resistance to flow in the tubing 11 is similar to resistance to flow in the system being cooled, this additional power requirement is similar to power delivered, namely, 222 watts, and requires that a voltage increment of 0.222 volts be applied to the coil assembly 12 to overcome this resistance.

Total voltage applied to the tubing assembly 12 is the sum of the above calculated voltages, and equals 0.460 volts (0.016+0.222+0.222). Most of the energy therefore goes into moving liquid gallium (444 watts) and not into electrical heating of the gallium (16 watts). Any heat which is generated by the pump 55 is carried away by liquid gallium, to be removed by the heat exchanger which controls the temperature of the liquid gallium. Thus, no additional heat exchanger is needed to cool the pump 55.

Figure 6B:
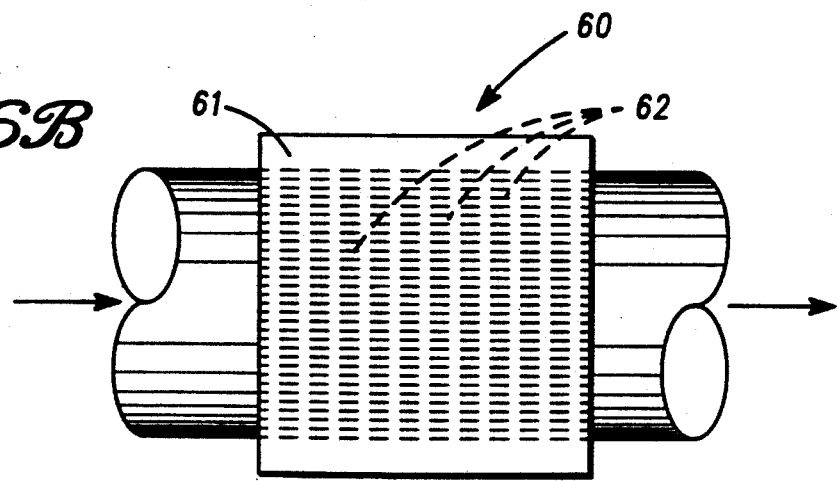

The previously described magnetic induction pump 55 has substantial advantages when used to pump cooling fluid through a heat exchanger 60 coupled to a semiconductor chip 61, as shown generally in FIG. 6A. Due to the superior performance capabilities of the pump 55, one can achieve very high pumping pressures of 100–900 psi and very high flow rates of many gallons per minute of liquid gallium. Such performance levels allow the use of very small diameter capillary tubes 62 shown in FIG. 6B as teh conduits of the heat exchanger 60 disposed adjacent a surface, such as the chip 61, to be cooled. Heat extraction (the heat transfer coefficient) varies as the inverse of the hydroflow dimension; and in the case of cylindrical tubing, the hydroflow dimension is the tubing diameter. Therefore, in order to take full advantage of this relationship, it is advantageous to have high pumping pressures and high fluid flow throughput.

Liquid materials, such as liquid metal gallium, are excellent choices a the fluid coolant based on being chemically inert, having high heat capacity, good thermal conductivity, low vapor pressure and high surface tension. The chemical inertness avoids hazards to human operators and users. The high heat capacity enables uptake of substantial heat from a source, and the good thermal conductivity allows rapid removal of the heat. In the illustrated embodiment the cooling performance is about three to nine times better than a comparable size water cooling system. The low vapor pressure (Ga melts at 29.7° C.) avoids generating dangerously high gas pressures which might cause explosions or disastrous leaks (such as steam being generated in a water system). The high surface tension of liquid gallium helps to avoid leakage of gallium from the heat exchanger 60 or from any of the tubing or seals in the system as a whole. Even when operating at high pumping pressures, it is difficult to force liquid gallium out of loose seals or from pinholes in tubing carrying the liquid gallium.

EXAMPLE

The stainless tube coil shown in FIGS. 1-4 is fabricated from a stainless steel tube having an O.D. of 0.500" and an I.D. of 0.4375". The coil consists of 9.5 turns of the tubing and has an I.D. of 4.00" and an O.D. of 5.00" with a height of 4.875". The ends of the coil are caped with 0.50" wide cylindrical copper buss bars on both ends. These busses extend the height of the coil to 6.25". Attached to these cylindrical busses are four rectangular buss bars (on each end) that feed the current to the cylindrical busses. When filled with gallium the electrical resistance of the coil parallel to its axis (across the coils) plus the buss bars is 0.000016 ohms or 16 micro ohms. This assumes that there is good electrical contact between the individual coils over a width of one half of the diameter of the stainless steel tube. A current of 1000 amps flowing through the tube assembly, requires a source voltage of 0.016 volts and generates 16 watts of electrical heat in the assembly. Approximately 8 watts of this heat is generated in the tube coil itself and the other 8 watts is generated in the copper busses.

When the pump is pumping liquid gallium, there is an additional back emf generated by the moving liquid gallium. If the pump is delivering 5 gpm at 100 psi, the effective work down by the pump is 222 watts. This will require that an additional emf or voltage of 0.222 volts (assuming a current of 1000 amps) be applied to the coil to do this work. There will be frictional resistance in the tube coil generated by this flow of 5 gpm that will require that additional work be done by the power supply. If the resistance to flow in the tube coil is similar to the resistance to flow in the system being cooled, this additional power requirement will be similar to the power delivered, namely, 222 watts, and will require an additional voltage increment of 0.222 volts be applied to the coil to over come this resistance. This frictional resistance to the flow of gallium in the tube coil will generate 222 watts of heat in the tube coil. The total voltage applied to the tube coil assembly is the sum of the above, and equals 0.460 volts (0.016+0.222+0.222+0.460).

Most of the energy therefore is used to move the gallium (444 watts) and not for electrically heating the gallium (16 watts). Thus the mechanical heating of the pump (222 watts) is much larger that the electrical heating of the pump (16 watts). The final 222 watts of power is dissipated outside of the pump in the system being cooled. It is important to note that almost all of the power will be absorbed by the flowing gallium and be carried off by the liquid gallium. This heat will then be removed by the water heat exchange system shown in FIG. 6A and this is controlling the temperature of the liquid gallium. Thus additional heat exchanger is needed to cool the pump. The primary heat exchanger would have to be able to absorb this 460 watts in addition to the heat that it was removing from the system it was cooling. If the flow in the system was 10 gpm with 1000 amps flowing through the pump, then the frictional heating in the pump would rise to 88 watts. This is because the resistance to flow is proportional to the square of the velocity of the fluid in these systems. If this were the case for normal operation it would be desirable to redesign the pump and the system being cooled for lower resistance to these flows. The typical semiconductor chips or crystals being cooled at present require about 12 psi pressure to push 4 gpm through the crystal cooling channels. Thus the work being done is only about 21 watts. At 8 gpm it would require a pressure drop across the crystal cooling channels of 48 psi and that would correspond to 170 watts of frictional heat generated.

A flow of 8 gpm corresponds to a flow of 8×63 =504 cc per sec. and will remove 504×2.2=1109 watts per degree centigrade rise in temperature of the gallium. Thus a 4.5 degree centrigrade rise in temperature will remove 5 KW of power from the system. This is quite sufficient for most synchrotron applications.

What is claimed is:

1. A magnetic induction pump for pumping liquid metals and other electrical current conductive liquids, comprised of:
    a tubing assembly comprised of a plurality of turns of electrically conductive tubing, suitably disposed for conveying an electrically conductive liquid through said conductive tubing;
    permanent magnet means for creating a constant magnetic field within said tubing assembly; and
    means for applying a voltage across said tubing thereby inducing a DC current to flow through said tubing substantially perpendicular to the direction of flow of said conductive liquid, and causing a current to interact with said magnetic field having its field direction substantially perpendicular to the direction of current flow, creating a force along the direction of flow of said conductive liquid which moves said conductive liquid through said tubing with a pressure of about 100-900 psi/1000 amps and up to about 5 gallons/minute liquid flow.

2. The apparatus of claim 1 wherein said tubing assembly is formed in the shape of a cylinder.

3. The apparatus of claim 2 wherein said tubing assembly is comprised of stainless steel tubing soldered at points of juncture between said turns.

4. The apparatus of claim 3 wherein said means for creating a constant magnetic field includes permanent magnets suitably disposed around said tubing assembly to generate magnetic flux which flows inwardly from each turn of said tubing toward the center of said cylinder from all points on the circumference of said cylinder.

5. The apparatus of claim 4 wherein said permanent magnets are shaped as cylinders and are comprised of individual segments, with each segment having an arc of 20 degrees.

6. The apparatus of claim 5 wherein said permanent magnets are constructed of neodymium-iron-boron ($Nd_2Fe_{14}B$).

7. A cooling system for a heat source, comprising:
a pump for circulating a liquid metal through said cooling system, said pump comprising means for applying a DC current flowing substantially perpendicular to the direction of flow of said liquid metal and a magnetic induction pump including permanent magnets for generating a substantially constant magnetic field of high strength having a magnetic field direction substantially perpendicular to the direction of current flow creating a force along the direction of flow of said liquid metal and moving said liquid metal through said cooling system; and
a heat exchanger network having a plurality of capillary flow tubes for transmitting said liquid metal therethrough, said network disposed in near association with said heat source.

8. The cooling system as defined in claim 7 wherein said permanent magnets comprise neodymium-iron-boron.

9. The cooling system as defined in claim 7 wherein said pump generates a pressure of about 100–900 psi.

10. The cooling system as defined in claim 7 wherein the cooling efficiency is about 3 to 9 times that of a water based cooling fluid system having the same pressure and flow rates.

11. The cooling system as defined in claim 7 wherein the work required to move said liquid metal is at least five percent of the work expended by said cooling system.

12. The cooling system as defined in claim 7 wherein said liquid metal consists essentially of gallium.

13. The cooling system as defined in claim 8, wherein said liquid metal flow rate through said heat exchanger network is at least 1–5 gallons per minute.

14. The cooling system as defined in claim 12 wherein said pump is cooled by the same heat exchanger controlling temperature of the gallium.

* * * * *

UNITED STATES PATENT AND TRADEMARK OFFICE
CERTIFICATE OF CORRECTION

PATENT NO. : 5,209,646

DATED : May 11, 1993

INVENTOR(S) : Robert K. Smither

It is certified that error appears in the above-identified patent and that said Letters Patent is hereby corrected as shown below:

| | |
|---|---|
| Column 1, Line 33, | insert a period (.) at the end of the sentence; |
| Column 1, Line 57, | cancel "add/or and insert -- and/or --; |
| Column 2, Line 11, | cancel "Pressure" and insert -- pressure --; |
| Column 2, Line 52, | cancel "1a" and insert -- 5a --; |
| Column 4, Line 62, | cancel "teh" and insert -- the --; |
| Column 5, Line 4, | cancel "a" and insert -- as --; |
| Column 5, Line 31, | cancel "caped" and insert -- capped --; |
| Column 6, Line 15, | cancel "88" and insert --888 --; |
| Column 6, Line 33, | as a new paragraph, insert the paragraph as shown on the following page: |

UNITED STATES PATENT AND TRADEMARK OFFICE
CERTIFICATE OF CORRECTION

PATENT NO. : 5,209,646
DATED : May 11, 1993
INVENTOR(S) : Robert K. Smither

It is certified that error appears in the above-indentified patent and that said Letters Patent is hereby corrected as shown below:

--The foregoing description of preferred embodiments and an example of the invention have been presented for purposes of illustration and description. These descriptions are not intended to be exhaustive or to limit the invention to the precise form disclosed, and many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.--

Signed and Sealed this

Nineteenth Day of April, 1994

*Attest:*

BRUCE LEHMAN

*Attesting Officer*  *Commissioner of Patents and Trademarks*